Oct. 10, 1950     I. M. DILLER     2,525,657
METHOD OF ELECTRIC ARC WELDING
Filed Aug. 19, 1948     4 Sheets-Sheet 1
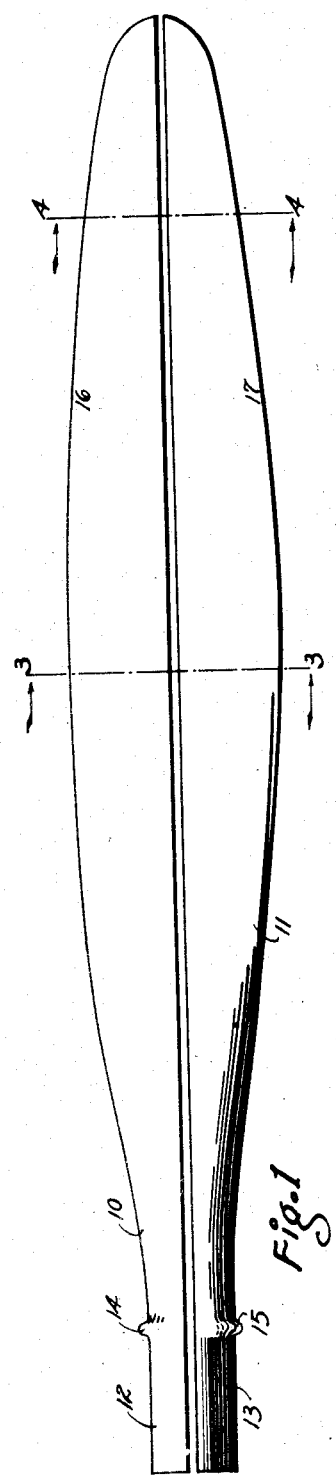
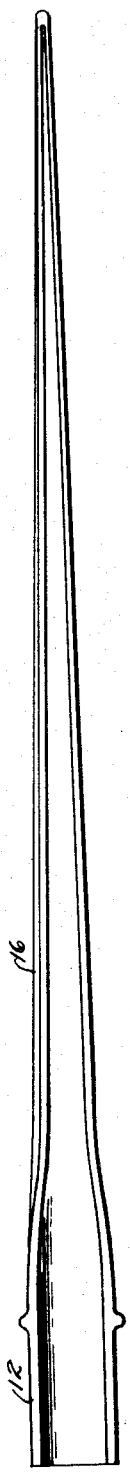
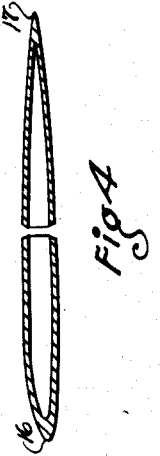
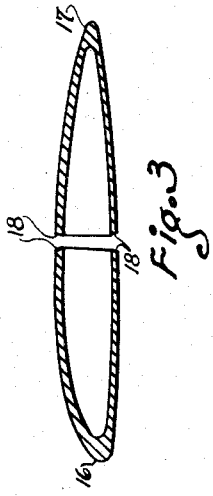
Inventor
ISAAC M. DILLER
BY Godfrey B. Speir
Attorney

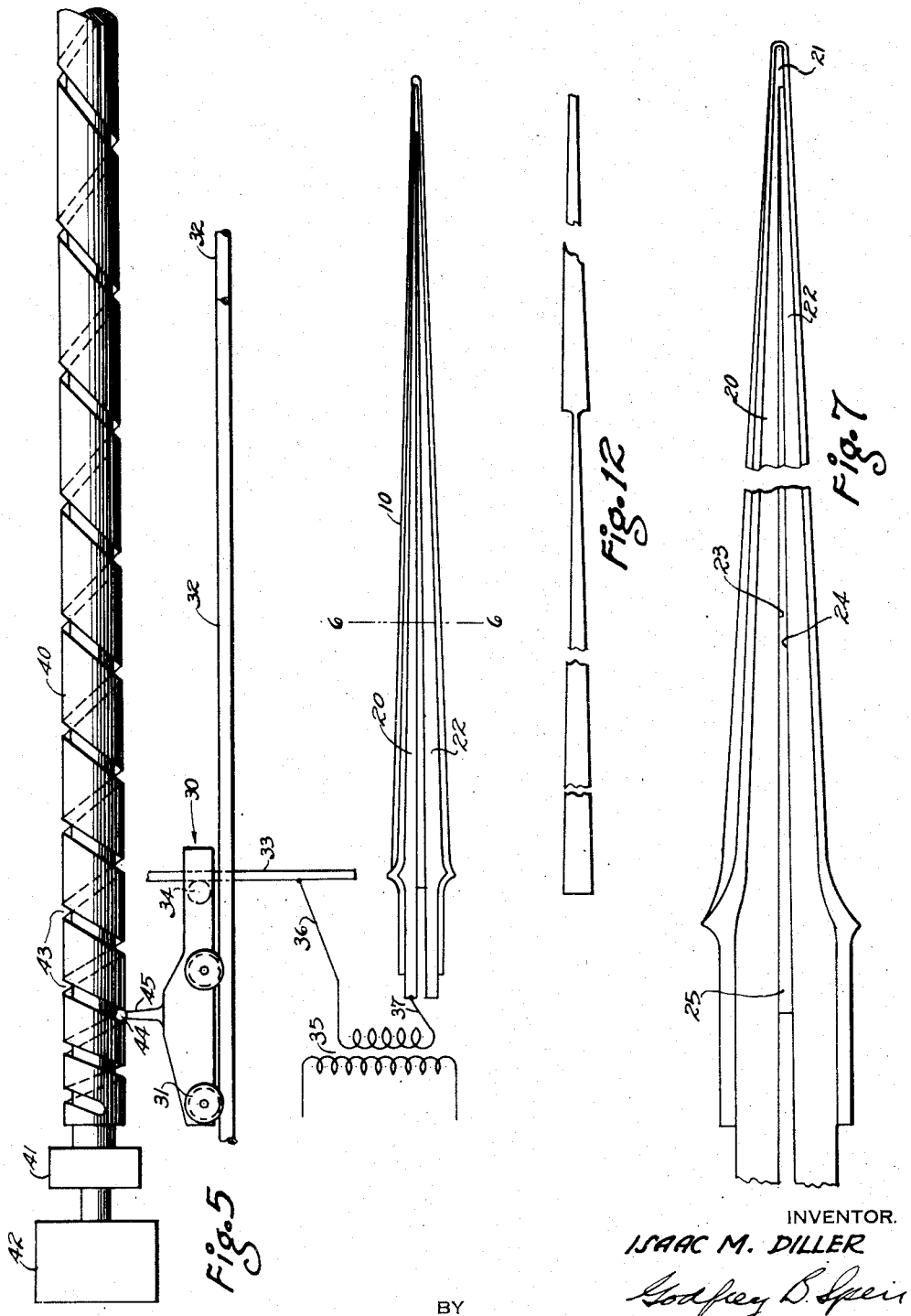

Oct. 10, 1950      I. M. DILLER      2,525,657
METHOD OF ELECTRIC ARC WELDING

Filed Aug. 19, 1948      4 Sheets-Sheet 3

INVENTOR.
ISAAC M. DILLER
BY Godfrey B. Speir
ATTORNEYS.

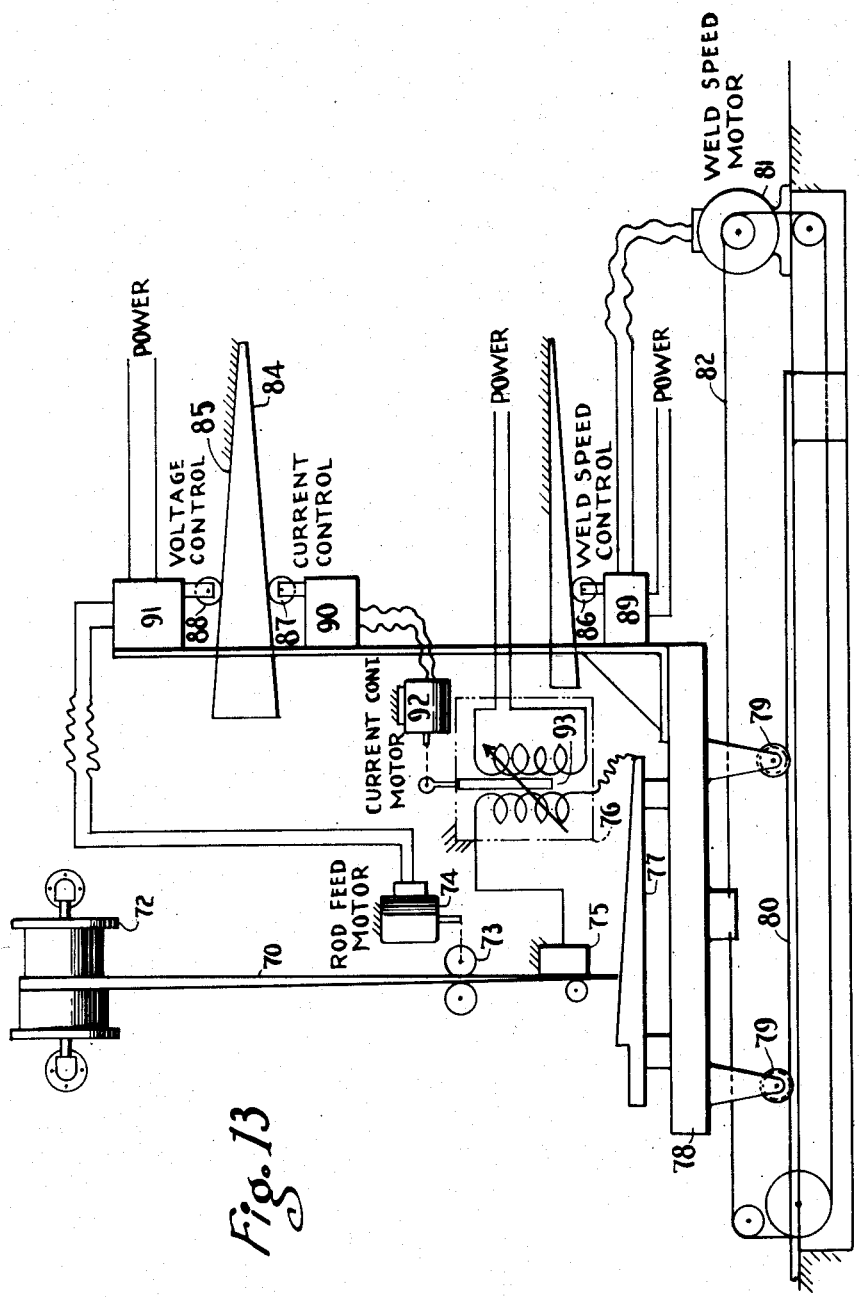

Patented Oct. 10, 1950

2,525,657

UNITED STATES PATENT OFFICE 2,525,657

METHOD OF ELECTRIC ARC WELDING

Isaac M. Diller, Glen Ridge, N. J.

Application August 19, 1948, Serial No. 45,187

10 Claims. (Cl. 219—10)

This invention relates to a method of welding under conditions involving varying workpiece thicknesses, where a high degree of perfection and uniformity is required. The invention described and claimed herein is a continuation-in-part of matter described and disclosed in my application Serial No. 495,573 filed July 21, 1943, which application was abandoned subsequent to the filing of this case. More specifically, it applies to making hollow airplane propeller blades of metal such as steel which will enable them to be made economically and reliably while at the same time producing a propeller which can utilize the strength of the metal to the full and maintain its resistance to vibrational fatigue.

In current practice the heating time of the welding, pouring of copper and resulting operations, requires about six hours of intensive and uneven heating. In accordance with my process, the welding is not only positioned in the region of least stress, but the total heating time is only from two to four minutes. The decarburization and stressing is correspondingly reduced.

Modern conditions make such severe demands upon propeller blades that they can best be met by hollow blades constructed of the best alloy steel. One of the favored present practices in making such blades consists in forming a pair of blanks of a high grade chrome-vanadium-steel—one blank for the thrust surface and one for the camber surface.

Each of these blanks is subjected to complex machining operations to give it the shape, thickness, taper, contour and form of the part of the blade it is to become. Of these two blanks the camber surface is the larger so that when the blanks are superposed, as for example, about a mandrel for welding, the thrust blank fits within the edges of the camber blank, leaving a substantial channel all along the leading and trailing edges of the blades and across the tip.

To unite the blanks, the entire structure is preheated to about 800° F. and welded by flowing the weld metal between the edges of the blanks. This requires about two hours. The operation leaves an outer surface which may be shaped to smooth contour, but the interior of the blade at the weld line is very irregular and jagged. Such a surface, if left, is a serious source of weakness, by concentrating the vibrational strains at the jagged points until the fatigue resistance of the metal is overcome. For these reasons it is the practice to braze onto the inside edges of the blade at the weld line a smooth copper fillet at a temperature of about 2050° F.

After all of these treatments, the blade is normalized by again heating it and cooling it slowly in a cooling chamber. The blade is then heated to about 1650° F. in forming dies and the contour is restored by internal pressure or by hammering. As a consequence of all these long and non-uniform heating operations, stresses are induced which are not quite relieved and furthermore the steel may be decarburized.

In operation, the direct stresses to which the blade is subjected, such as the bending moments and the centrifugal forces, are augmented by vibrational stresses. The pattern of these vibrational stresses is very complex and varies with the conditions of use. Of these stresses we may mention the breathing of the blade, that is the tendency of the thrust and camber faces to expand away from each other periodically, the bending of the blade due to the thrust strains, and vibration of the blade about its longitudinal axis. These vibrational stresses make it important to construct the blade with high fatigue resistance.

It is an object of this invention to remedy limitations of prior modes of blade construction insofar as possible by constructing the blade with a minimum of heating and a minimum of deterioration of the metal and to produce a blade in which the weight of the metal is distributed away from the edges in accordance with considerations of optimum design rather than the present practice of disposing welds at the edges.

It is a further object of the invention to teach a novel method of procedure whereby a blade constructed in accordance with the present disclosures may be manufactured with a minimum expenditure of time.

A still further object is that of teaching a process which may be practiced with a minimum of manual supervision; thus reducing expense. Accordingly, the present method may largely be practiced by the use of automatic or semi-automatic machinery and procedures.

An additional object is that of providing a blade which will embody a maximum of strength and be capable of being readily balanced; such blade functioning with high efficiency and incorporating factors such that the dangers of failure will be reduced to a minimum.

With these and other objects in mind, reference is had to the attached sheets of drawings illustrating practical embodiments of the invention, and in which:

Fig. 1 is a plan view of two blanks from which the blade is to be made, assembled ready for welding;

Fig. 2 is a side elevation of one of the blade sections from the open side;

Figure 6:
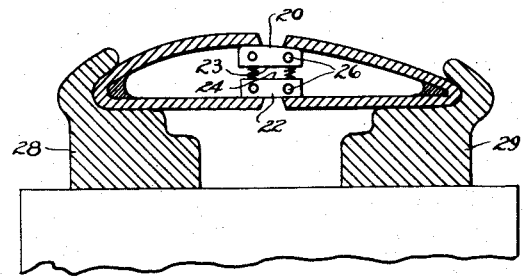
Figure 8:
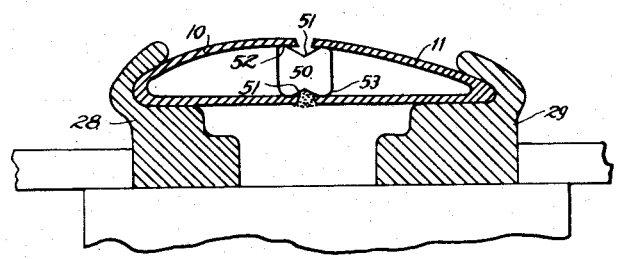
Figure 10:
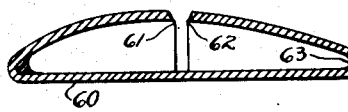
Figure 11:
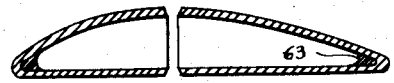
Figure 9:
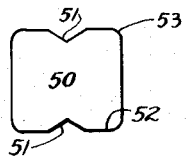

Figs. 3 and 4 are sections along the lines 3—3 and 4—4 respectively of Fig. 1, and slightly enlarged for convenience of illustration;

Fig. 5 is a diagrammatic view of the apparatus suitable for welding the blade, with the parts assembled;

Fig. 6 is a section along the line 6—6 of Fig. 5;

Fig. 7 is a view similar to part of Fig. 5, but enlarged, better to show the details;

Fig. 8 is a view similar to Fig. 6, of an alternative form of construction;

Fig. 9 is a detail of the web shown in Fig. 8;

Figs. 10 and 11 are sectional views of further forms of construction;

Fig. 12 shows a weld rod suitable for use with the process; and

Fig. 13 shows, more or less schematically, welding equipment used in association with the tapered welding rod of Fig. 12.

In the manufacture of large blades in accordance with this invention, the front half of the camber face and the front half of the thrust face of the blade is pressed, or otherwise appropriately formed, as a single piece or blank from sheet metal of the proper thicknesses, or it may be brought to the proper thicknesses after it is formed to shape. The rear half of the camber face and the rear half of the thrust face is similarly made as a single piece or blank, the blanks being thus designed to be welded together along substantially the center line of each face. Thus the blade, instead of being divided and welded along a plane containing the leading and trailing edges, is divided along a plane containing the centerlines of the faces. Each of the section edges along what are to be the weld lines, is cut at an angle so that when the parts are assembled for welding, a V shape groove will be formed for welding.

While the two halves may be formed by forging, the trailing edge presents a very considerable problem and I propose to overcome this as shown in Fig. 10. The sheet metal for the blank comprising the trailing edge is folded sharply, the base of the V is now filled in by welding, preferably automatic arc welding. The weld metal is shown in the shaded portion of Fig. 10. The blank is then rough machined and forged to final shape. It will be observed that the inside of the trailing edge is rounded to form a fillet. It should be observed that no copper is required, while at the same time a notch-free surface results.

In the drawings, the numeral 10 designates one of the blade blanks, and the numeral 11 the other. As will be understood, each of these blanks is shaped to conform to the part of the blade it is to become; otherwise the two blanks are alike and complementary. Each blank has at one end a semi-circular hub portion 12, or 13, which may have a thickness of wall, for example, of ½ inch, which joins as at 14 or 15 the airfoil section 16 or 17. The thickness of the metal may be substantially constant except at the blade edges throughout any cross section, as will be seen in Figs. 2, 3 and 4, but will taper down toward the tip of the blade to about one-sixteenth inch. The cut-away portion at the meeting edges is shown at 18 to form the V slot above referred to. It will be noted, however, that the edges are separated further, that is the slot is wider at the hub end than at the tip, so as to facilitate filling the slot to the bottom and so that the greater thickness of sheet metal will not chill the weld metal before it unites the edges of the blanks. The relative width of the slot throughout its length is one of the adjustable factors in setting up my process.

One of the variable factors to be contended with is the balancing of the loss of heat through conduction, and the variation of rod speed, or thickness, or the width of the gap must be determined from this standpoint also.

In welding the parts together they are assembled about a composite mandrel, comprising primarily a pair of blocks which are in alignment with and bear against the edges to be welded. These blocks are of a material which will not deteriorate in contact with the weld metal, such as graphitized zirconium silicate. The use of such method for holding the "flash" to a negligible quantity is shown in another connection in my Patent No. 2,402,381 issued June 18, 1946. I prefer, however, to employ a cooled copper block.

As a consequence, the inner surface of the weld remains smooth and notch-free and the metal surface has not deteriorated due to atmospheric contact. This weld is placed in the region of least vibrational stress and a very slight amount of roughness may be tolerable in this position. With the use of either of these materials in contact with the inner surface of the weld the roughness may be held to such a fine point that an abrasive stream consisting of a high pressured flow of a suspension of abrasive is sufficient to polish the inner surface where the graphitized ceramic is used. The graphite in part forms a beneficial gaseous atmosphere.

In Figs. 6 and 7 of the drawings, the numeral 20 represents such a block of copper shaped to conform to the inside of the blade throughout the entire length of the weld, fitting against the inner side of the upper face only. As shown in Fig. 7, this block however, at its tip is enlarged at 21 to fit against both upper and lower faces. A mating block 22 of generally similar shape engages the inner side of the lower face at the weld line, but this lower block terminates against the enlarged portion 21 of the block 20 with a smooth outer contour. These blocks have relatively inclined inner surfaces 23 and 24 so that after assembly they may be forced up tight against the weld line by a suitably shaped wedge 25.

Each of the blocks 20 and 22, when made of copper, will be provided with a water circulating channel 26 through which cooling water may be flowed.

The composite mandrel may, if desired, have composite side portions (not shown) to give support to the portions of the blade in front of and behind the blocks 20 and 21. I prefer also to employ clamps 28—29, as shown in Figs. 6 and 8, to grasp the front and trailing edges of the blade to hold it rigid during the welding operation.

The welding is accomplished by moving a suitable welding apparatus along the weld line, but on account of the very great variation in the thickness of the metal, it is essential that the weld metal melted per inch of length of the weld shall vary corresponding to the variation in thickness. Preferably, this rate will be faster than the rate of variation in the thickness. Thus at the hub end where the thickness is about one-half inch, the weld will require several times as much metal per inch as at the tip and where the thickness is of the order of one-sixteenth inch.

This change in the rate of welding may be accomplished either by varying the rate of melting of the weld metal at the heavier end or by adjusting the rate of travel of the welding apparatus along the weld line. I have shown in the drawings both such means.

In Fig. 5, I show diagrammatically a welding head 30 moving on wheels 31 along tracks 32, which are generally parallel to the weld line. 33 diagrammatically represents the weld wire fed from a source (not shown) by a motor-driven wheel 34 upon the weld head. Numeral 35 represents diagrammatically a source of energy such as a transformer connected by wires 36 and 37 to the weld head 30 and to the blocks 20 and 22. The welding is accomplished by the maintenance of an arc between the rod 33 and the blanks 10—11 and blocks 20.

In this diagrammatic view, means are provided for moving the weld head 30 along the weld line comprising a screw 40 driven by a reduction gear 41 from a motor 42. This screw has a continuous groove 43 preferably of constant width, which increases in pitch from one end to the other, and within this groove there is fitted a roller 44 carried by an arm 45 mounted on the welding head. In this way, the rate of travel of the welding head down the weld line is measured by the rate of turning of the screw 40 and by the variable pitch of the groove 43.

In carrying out this process, it is advantageous to vary the rate of melting of the weld metal to compensate or partly compensate for the difference in thickness of the blank, rather than to rely wholly upon varying the rate of movement of the welding head. To accomplish this result, it is desirable to employ a rod having a diameter varying in accordance with the rate of metal to be melted, thus having a tapered construction, as shown in Fig. 12. This rod may be continuous so that it may be fed from a coil or it may be fed in individual lengths each suitable for one blade. The weld rod may be constructed in this fashion by machining, casting, forging or any other process suitable for this operation. As will be seen from Fig. 12, welding wire is formed so that it tapers in relationship to the thickness of the metal, being heavier when fed to the heavier portion of the metal and lighter as it reaches the tip. The rod is fed to the weld at uniform speed and the arc is made to travel at uniform speed and the shape of the wire is made to correspond to the cross-section of the metal as it reaches respective portions of the weld line. This shaping method may also be used in conjunction with the non-linear wire feed and non-linear arc travel. It is desirable to vary the current or heating rate with the taper of the rod so that more heat is fed to the weld where the rod is thicker. In the case of the automatic arc welding which is here illustrated the welding current is varied by inserting into the current supply circuit a variable resistance or reactor associated with the transformer 35, which is controlled by a motor mechanism synchronized with the rod feed. The use of the tapered rod has the further advantage of enabling the maintenance of optimum conditions at every point of the weld.

Reference may now be made to Fig. 13, which shows exemplary welding equipment with which the tapered welding rod of Fig. 12, or a like rod, may be used to carry out the technique recited briefly in the foregoing paragraph. Herein tapered welding rod 70 is shown as coiled on a feed spool 72, the rod being fed at a desired rate by rolls 73 driven by a rod feed motor 74. The rod is then passed across a fixed current transfer shoe 75, connected as shown to the secondary of a variable welding transformer 76. The rod may thus be fed toward a variable thickness workpiece to be welded, designated 77, as the workpiece is moved with respect to the weld rod. The other lead from the welding transformer is connected to the workpiece. I show the workpiece as mounted upon a movable work table 78, which, for convenience in illustrating its mobility, is shown as being supported by rollers 79 engaging a track 80. The table 78 is traversed by a motor 81 and a flexible drive 82 as shown.

In practicing the invention, I establish a desired schedule of welding rod size, welding speed, welding current and welding voltage for each point along the workpiece, and set up schedule, in accordance with the varying thickness of the workpiece, on cams 83, 84 and 85 respectively, these cams being fixed, and being engaged respectively by camfollowers 86, 87 and 88 mounted in or associated with control boxes 89, 90 and 91 secured to and movable with the work table 78.

In the case of the welding speed control, movement of the camfollower 86 relative to its box 89, as influenced by the cam 83 profile, affords control of speed of the motor 81 by appropriate motor speed control mechanism (known in the art) contained within or associated with the box 89. While in some instances the weld speed may be maintained uniform, ordinarily the weld speed would be greater where the workpiece thickness is small, and less where the workpiece thickness is large.

As to welding current control, movement of the cam-follower 87 is influenced by the cam 84 operates on known current control means to produce a welding current schedule desired for the workpiece. In general, such a schedule includes low current density for thin workpiece portions and thin portions of the welding rod, with increasing current density as the workpiece and rod increase in thickness. The controller 90 is shown as operating a current control motor 92, which shifts a variable core 93 forming part of the welding current transformer.

As to welding voltage control, movements of the cam-follower 88 as influenced by the cam 85 operate on known voltage control means in the controller 91 to energize the rod feed motor 74 for greater or less speed, accordingly as a lesser or greater welding voltage may be desired, as called for by the cam. The welding voltage desired according to a schedule may not necessarily vary with the thickness of the workpiece although it can do so.

In coordinating the schedules of rod size, welding speed, current control and voltage control, a plurality of locations may be selected along the workpiece, and for each location, the optimum rod size, weld speed, current density and welding voltage will be chosen. The control cams will then be profiled to produce the appropriate values of weld speed, current density and voltage throughout a welding pass. It is presumed that when the cams and characteristics of the welding machine are set up, that a continuous welding pass will be made from one end of the workpiece to the other. The welding rod taper, in conjunction with the values of weld speed, current and voltage will also be chosen to produce the optimum weld at any point along the workpiece. An optimum weld thus attained not only contains the proper amount of deposited weld metal, but also is one in which the weld and adjacent parent metal are as homogenous as possible, brought about by correctly correlated rod size, welding current, voltage, and speed. Thereby the weld is not subject to imperfections due to underheating or overheating of either rod or workpiece, and correct heating of both elements of the weld is assured.

In this connection, it is known that there is an optimum cross-sectional area for welding rod based upon the thickness of the material being welded. The tapered or varying welding rod of this invention may readily be formed from a flat welding strip of uniform thickness, the varying cross-sectional area of the rod being attained by cutting the strip with a width varying generally in consonance with the thickness of the workpiece.

It is not intended necessarily that the rod feed speed be the same as the speed of travel of the workpiece carrier—rather, the welding rod preferably is fed at a speed considerably in excess of the speed of the workpiece carrier. To this end, a welding rod for a given pass may be several times as long as the workpiece itself, and the weld rod would be fed at several times the speed of travel of the workpiece with respect to the rod. Preferably, a piece of weld rod for a given welding pass would be somewhat longer than that required to complete the weld so that there will be leeway should the arc be quenched and should a welding arc have to be restarted. The sectional area of the weld rod will not be so critical as to be sensitive to such interruptions in a weld or to precise determination of the particular part of the weld rod which should be utilized for initiating a weld pass. This lack of criticalness is compensated by the concurrent utilization of the automatic speed, current and voltage controls for the weld.

In effect, the provisions of this invention permit optimum welding of pieces of variable thickness so that deviations from the best possible combinations of rod thickness, weld speed, current density and voltage will be minute in character, rather than large in magnitude in accordance with present practice.

Currently, when a variable thickness workpiece is to be welded, a compromise uniform rod size is utilized which, while not optimum, must not be too large for the thinnest part of the workpiece and must not be too small for the thickest part of the workpiece. Clearly, this condition does not provide optimum welding conditions and compensation to approach the optimum as well as possible are made by varying weld speed, current density and voltage to compensate for the errors in rod thickness. While current techniques produce excellent welds, I find that improvements can be had by utilizing the teachings of the invention as outlined in the immediately preceding paragraphs, since no large scale compromise in rod cross-sectional area is required. The degree of matching of rod thickness with instant thickness of the workpiece depends on the degree of perfection which is to be obtained in the weld as balanced by the practical problem of matching rod cross-section with workpiece thickness. The improvements, even with approximate matching, potentially produce welds of superior character to those obtained by the current method wherein uniform rod thickness is used regardless of thickness of the workpiece.

While means are herein shown to enable the fabrication of a blade without the necessity of internal machining after completion of the structure and without the necessity of a copper fillet to ameliorate the effect of an internal jagged surface, such means will not always be required as my process and designs lend themselves to the incorporation of a longitudinal rib or ribs to reduce breathing of the blade faces. Indeed, the primary use for hollow metal blades is in the large sizes. Fig. 8 shows such a blade in which the blanks 11 and 12 are assembled about a rib 50. This rib has a central longitudinal groove 51 extending throughout its length, on each of its faces, in position to be in alignment with the channel between the edges of the blade blanks. Thus, the rib is formed to provide two longitudinal edges 52 to conform to a fit against the edges of the blade blanks adjacent to, but slightly spaced from the edges thereof. The outer edges of the rib 50, as shown at 53, are rounded off slightly to avoid a sharp edge where the rib and the blank part, to avoid the notch effect which might otherwise take place at the edge of the rib. The weld metal is deposited so as to penetrate into the rib metal; thus the same welding operation which welds the seam secures the rib and at the same time no jagged surface can be present as the metal is incorporated into the rib. I prefer to design the rib so that its edges 53 are not sharp. The vibrational patterns in a blade are complex and vary with conditions of use. If the edge is sharp it may form a fulcrum about which the inner surface of the blade will become notched. The rounding of the shoulder obviates this effect.

In the form of the invention disclosed in Fig. 10, a single blank is formed by a sheet of metal 60 which is folded around to form the entire blade, the free edges 61—62 being brought together upon the approximate center line of the camber surface, and the welding takes place along that line, so that in this respect this modification is similar to the first embodiment except that only one weld line is required. The fillet of the trailing edge may be constructed by upsetting or deposition of weld rod, as shown at 63, as described above before completing the folding operation.

One of the major effects of the improvements herein described is the reduction in overall heating time, thereby reducing deterioration of the blade. It is preferred that the welding be performed automatically and not more than two minutes of welding time need be required in the use of my invention for a blade ten feet in length.

Since certain changes may be made in the above construction and different embodiments of the invention could be made without departing from the scope thereof, it is intended that all matter contained in the above description or shown in the accompanying drawing shall be interpreted as illustrative and not in a limiting sense, except as limitations may be implied in the following claims.

What is claimed is:

1. The method of welding metal members of varying thickness in a continuous pass along a path to be welded, which consists in feeding a welding rod of varying mass per unit length toward the weld path at a definite feed rate as the members are moved along the weld path at a definite speed of travel, the feed rate and speed being so related that mass variation of the weld rod becomes greater or less substantially in consonance with the respectively greater or lesser thickness of the members moving relative thereto, and in supplying electrical welding energy in the form of a welding arc between the rod end and the members.

2. The method of welding metal members of varying thickness in a continuous pass along a path to be welded, which consists in feeding a welding rod of varying mass per unit length toward the weld path at a definite feed rate as the members are moved along the weld path at a definite speed of travel, the feed rate and speed being so related that mass variation of the weld rod becomes greater or less substantially in consonance with the respectively greater or lesser thickness of the member moving relative thereto, in supplying electrical welding energy in the form of a welding arc between the rod end and the members, and in establishing the rate of rod feed along the weld pass to yield an optimum voltage drop across the welding arc at each point along the members.

3. The method of welding metal members of varying thickness in a continuous pass along a path to be welded, which consists in feeding a welding rod of varying mass per unit length toward the weld path at a definite feed rate as the members are moved along the weld path at a definite speed of travel, the feed rate and speed being so related that mass variation of the weld rod becomes greater or less substantially in consonance with the respectively greater or lesser thickness of the member moving relative thereto, in supplying electrical welding energy in the form of a welding arc between the rod end and the members, in establishing the rate of rod feed along the weld pass to yield an optimum voltage drop across the welding arc at each point along the members, and in controlling the welding current along the weld pass to greater or lesser amount in consonance with the respectively greater or lesser thickness of the rod and members at each point along the members.

4. The method of welding metal members of varying thickness in a continuous pass along a path to be welded, which consists in feeding a welding rod of varying mass per unit length toward the weld path at a definite feed rate as the members are moved along the weld path at a definite speed of travel, the feed rate and speed being so related that mass variation of the weld rod becomes greater or less substantially in consonance with the respectively greater or lesser thickness of the members moving relative thereto, in supplying electrical welding energy in the form of a welding arc between the rod end and the members, in establishing the rate of rod feed along the weld pass to yield an optimum voltage drop across the welding arc at each point along the members, in controlling the welding current along the weld pass to greater or lesser amount in consonance with the respectively greater or lesser thickness of the rod and members at each point along the members, and in controlling the speed of travel of the members relative to the weld rod to a lesser or greater rate respectively as the thickness of the members is greater or less.

5. The method of welding metal members of varying thickness in a continuous pass along a path to be welded, which consists in feeding a welding rod of varying mass per unit length toward the weld path at a definite feed rate as the members are moved along the weld path at a definite speed of travel, the feed rate and speed being so related that mass variation of the weld rod becomes greater or less substantially in consonance with the respectively greater or lesser thickness of the members moving relative thereto, in supplying electrical welding energy in the form of a welding arc between the rod end and the members, and in controlling the welding current along the weld pass to greater or lesser amount in consonance with the respectively greater or lesser thickness of the rod and members at each point along the members.

6. The method of welding metal members of varying thickness in a continuous pass along a path to be welded, which consists in feeding a welding rod of varying mass per unit length toward the weld path at a definite feed rate as the members are moved along the weld path, at a definite speed of travel, the feed rate and speed being so related that mass variation of the weld rod becomes greater or less substantially in consonance with the respectivey greater or lesser thickness of the members moving relative thereto, in supplying electrical welding energy in the form of a welding arc between the rod end and the members, and in controlling the speed of travel of the members relative to the weld rod to a lesser or greater rate respectively as the thickness of the members is greater or less.

7. The method of welding metal members of varying thickness in a continuous pass along a path to be welded, which consists in feeding a welding rod of varying mass per unit length toward the weld path at a definite feed rate as the members are moved along the weld path at a definite speed of travel, the feed rate and speed being so related that mass variation of the weld rod becomes greater or less substantially in consonance with the respectively greater or lesser thickness of the members moving relative thereto, in supplying electrical welding energy in the form of a welding arc between the rod end and the members, in establishing the welding current along the weld pass to greater or lesser amount in consonance with the respectively greater or lesser thickness of the rod and members at each point along the members, and in controlling the speed of travel of the members relative to the weld rod to a lesser or greater rate respectively as the thickness of the members is greater or less.

8. The method of welding metal members of varying thickness in a continuous pass along a path to be welded, which consists in feeding a welding rod of varying mass per unit length toward the weld path at a definite feed rate as the members are moved along the weld path at a definite speed of travel, the feed rate and speed being so related that mass variation of the weld rod becomes greater or less substantially in consonance with the respectively greater or lesser thickness of the members moving relative thereto, in supplying electrical welding energy in the form of a welding arc between the rod end and the members, in establishing the rate of rod feed along the weld pass to yield an optimum voltage across the arc at each point along the members, and in controlling the speed of travel of the members relative to the weld rod to a lesser or greater rate respectively as the thickness of the members is greater or less.

9. The method of depositing weld metal along a path on a member traveling at a scheduled speed and of varying thickness along the path, by an electric arc welding process, which consists in feeding to the arc at a substantially uniform feed rate a weld rod whose mass per unit length varies directly as the thickness of said member varies, as it travels along said path.

10. The method of depositing weld metal along a path on a member traveling at a scheduled speed and of varying thickness along said path, by an electric arc welding process, which consists in varying the welding current to greater or lesser amount between a welding rod and the member along said path as member thickness at the weld zone becomes greater or less, and in concurrently increasing or decreasing respectively the mass per unit length of the weld rod fed to the arc while holding the linear rate of rod feed substantially constant.

ISAAC M. DILLER.

REFERENCES CITED

The following references are of record in the file of this patent:

UNITED STATES PATENTS

| Number | Name | Date |
|---|---|---|
| 1,496,930 | Flood et al. | June 10, 1924 |
| 2,025,206 | Holslag | Dec. 24, 1935 |
| 2,438,593 | Wright | Mar. 30, 1948 |